(12) United States Patent
Lee

(10) Patent No.: US 7,228,823 B2
(45) Date of Patent: Jun. 12, 2007

(54) ENGINE-DRIVEN VEHICLE COOLING DEVICE

(75) Inventor: Ki Ho Lee, Seoul (KR)

(73) Assignee: Doosan Infracore Co., Ltd., Dong-Gu, Incheon (KR)

( * ) Notice: Subject to any disclaimer, the term of this patent is extended or adjusted under 35 U.S.C. 154(b) by 0 days.

(21) Appl. No.: 11/334,873

(22) Filed: Dec. 23, 2005

(65) Prior Publication Data
US 2006/0137628 A1    Jun. 29, 2006

(30) Foreign Application Priority Data
Dec. 29, 2004  (KR) .................... 10-2004-0115578

(51) Int. Cl.
*F01P 7/14* (2006.01)
(52) U.S. Cl. .................. 123/41.49; 123/41.31
(58) Field of Classification Search ............. 123/41.49, 123/41.31, 41.65
See application file for complete search history.

(56) References Cited

U.S. PATENT DOCUMENTS

| | | | |
|---|---|---|---|
| 6,192,838 B1 * | 2/2001 | Matsuo et al. ........... | 123/41.01 |
| 6,192,839 B1 * | 2/2001 | Takeshita et al. ........ | 123/41.49 |
| 6,220,207 B1 * | 4/2001 | Kawasaki et al. ....... | 123/41.11 |
| 6,622,668 B2 * | 9/2003 | Izumi ...................... | 123/41.49 |
| 6,871,697 B2 * | 3/2005 | Albright et al. .............. | 165/51 |
| 6,957,689 B2 * | 10/2005 | Ambros et al. ................ | 165/41 |
| 7,051,787 B2 * | 5/2006 | Taguchi ....................... | 165/41 |
| 7,147,038 B2 * | 12/2006 | Taguchi ....................... | 165/41 |
| 2002/0104491 A1 * | 8/2002 | Izumi ...................... | 123/41.49 |

* cited by examiner

*Primary Examiner*—Noah P. Kamen
*Assistant Examiner*—Jason Benton
(74) *Attorney, Agent, or Firm*—Brouse McDowell; Heather M. Barnes

(57) ABSTRACT

An engine-driven vehicle cooling device includes an engine room for reception of an engine, a radiator provided within the engine room for cooling down a cooling water circulating through the engine, a cooling fan positioned between the engine and the radiator for blowing an internal air present in the engine room toward the radiator, a charged air cooler smaller in size than the radiator and disposed between the radiator and the cooling fan in a parallel relationship with the radiator, a shroud provided at an intake side of the cooling fan in the engine room for obstructing a stream of the internal air heading for the charged air cooler, and an external air inlet opening provided between the shroud and the cooling fan for allowing an external air present outside the engine room to be supplied to the charged air cooler as the cooling fan is caused to rotate.

8 Claims, 9 Drawing Sheets

ENGINE-DRIVEN VEHICLE COOLING DEVICE

This application claims priority from Korean Patent Application No. 10-2004-0115578, filed Dec. 29, 2004.

I. BACKGROUND OF THE INVENTION

A. Field of the Invention

The present invention is directed to a common use pedal device for use in automotive vehicles, and more specifically, to a common use pedal device that can be applied to both a manually controlled vehicle and an electronically controlled vehicle in common.

B. Description of the Related Art

Automotive vehicles are usually provided with a plurality of pedal devices, e.g., an accelerator pedal for accelerating the vehicles, a brake pedal for reducing the speed of the vehicle and a clutch pedal for disconnecting power delivery.

Such pedal devices may be classified into a manually controlled pedal device adapted for use in carburetor-equipped vehicles and an electronically controlled pedal device for use in vehicles incorporating an Electronic Control Unit (also referred to as "ECU").

The manually controlled pedal device is operatively connected to a throttle valve by way of a cable and, when pressed down by an operator, can be rotated about a pivot axis to pull the cable. This controls the degree of opening of the throttle valve.

The electronically controlled pedal device is electrically associated with the electronic control unit and can be rotated at an angle as it is pressed down by the operator. The angle of rotation is detected by a detection sensor and notified to the electronic control unit that controls an electronically controlled engine, based on the result of detection.

Most of automotive vehicles recently on sale are equipped with the electronic control unit for electronically controlling various vehicle operations, which rapidly increases the demand for the electronically controlled pedal device.

Despite such situation, the manually controlled vehicles continue to be in use together with the electronically controlled vehicles. This makes it inevitable to separately produce the manually controlled pedal device and the electronically controlled pedal device. Producing the two kinds of pedal devices separately is quite costly and time-consuming, consequently increasing the overall throughput and production costs.

II. SUMMARY OF THE INVENTION

Accordingly, it is an object of the present invention to provide a common use pedal device for automotive vehicles that can be employed in common in a manually controlled pedal type vehicle and an electronically controlled pedal type vehicle.

Another object of the present invention is to provide a common use pedal device for automotive vehicles that, by making the rotation stroke of a pedal adjustable, allows a vehicle user to readily adjust the pulling amount of a cable or the electric signal generation range which varies with the rotation angle of a pedal.

With these objects in view, the present invention provides a common use pedal device for automotive vehicles, comprising: a base plate; a pedal pivotably attached to the base plate and having a push rod extending downwards from an underneath surface of the pedal; a rotating member mounted to the base plate in such a manner that the rotating member can be depressed and rotated by the push rod of the pedal, the rotating member having a pulling arm adapted to pull a manual operating cable in response to rotation of the rotating member; and a rotation detecting sensor provided on one side of the base plate for detecting the degree of rotation of the rotating member and notifying an electronic control unit of the degree of rotation thus detected.

In a preferred embodiment of the present invention, it is desirable that the common use pedal device further comprise a stroke adjustor means for adjusting a rotational stroke of the pedal, the stroke adjustor means including: a fixed stopper fixedly secured to the underneath surface of the pedal and having a slant bottom surface inclined at a predetermined angle with respect to a top surface of the base plate; a movable stopper movably attached to the slant bottom surface of the fixed stopper and displaceable upwardly or downwardly along the slant bottom surface for changing the spacing between the top surface of the base plate and the movable stopper to thereby adjust the rotational stroke of the pedal; and a fastener means for releasably affixing the movable stopper to the slant bottom surface of the fixed stopper.

In a preferred embodiment of the present invention, it is desirable that the fastener means include: a slot formed along the slant bottom surface of the fixed stopper; a fixing bolt inserted through the slot for holding the movable stopper in a rotatable and axially movable manner; and a nut threadedly engaged with an end of the fixing bolt for affixing the movable stopper against the fixed stopper.

In a preferred embodiment of the present invention, it is desirable that the fixed stopper be integrally formed with the push rod.

In a preferred embodiment of the present invention, it is desirable that the common use pedal device further comprise a slip-proof means for preventing the movable stopper from slipping with respect to the slant bottom surface of the fixed stopper, the slip-proof means including a plurality of V-shaped grooves formed contiguously on the slant bottom surface of the fixed stopper and a plurality of triangular protrusions engaged with the V-shaped grooves.

In a preferred embodiment of the present invention, it is desirable that the pulling arm of the rotating member be provided with a plurality of cable catch holes for holding the cable, the cable catch holes arranged at different radial positions from an axis of the rotating member.

In a preferred embodiment of the present invention, it is desirable that the rotating member have a roller for making a rolling contact with the push rod of the pedal with a reduced frictional force.

In a preferred embodiment of the present invention, it is desirable that the common use pedal device further comprise a support bracket detachably attached to the base plate for supporting a cable sheath through which the cable extends.

In a preferred embodiment of the present invention, it is desirable that the rotation detecting sensor be provided in a coaxial relationship with the rotating member.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

IV. DESCRIPTION OF THE PREFERRED EMBODIMENT

Figure 1:
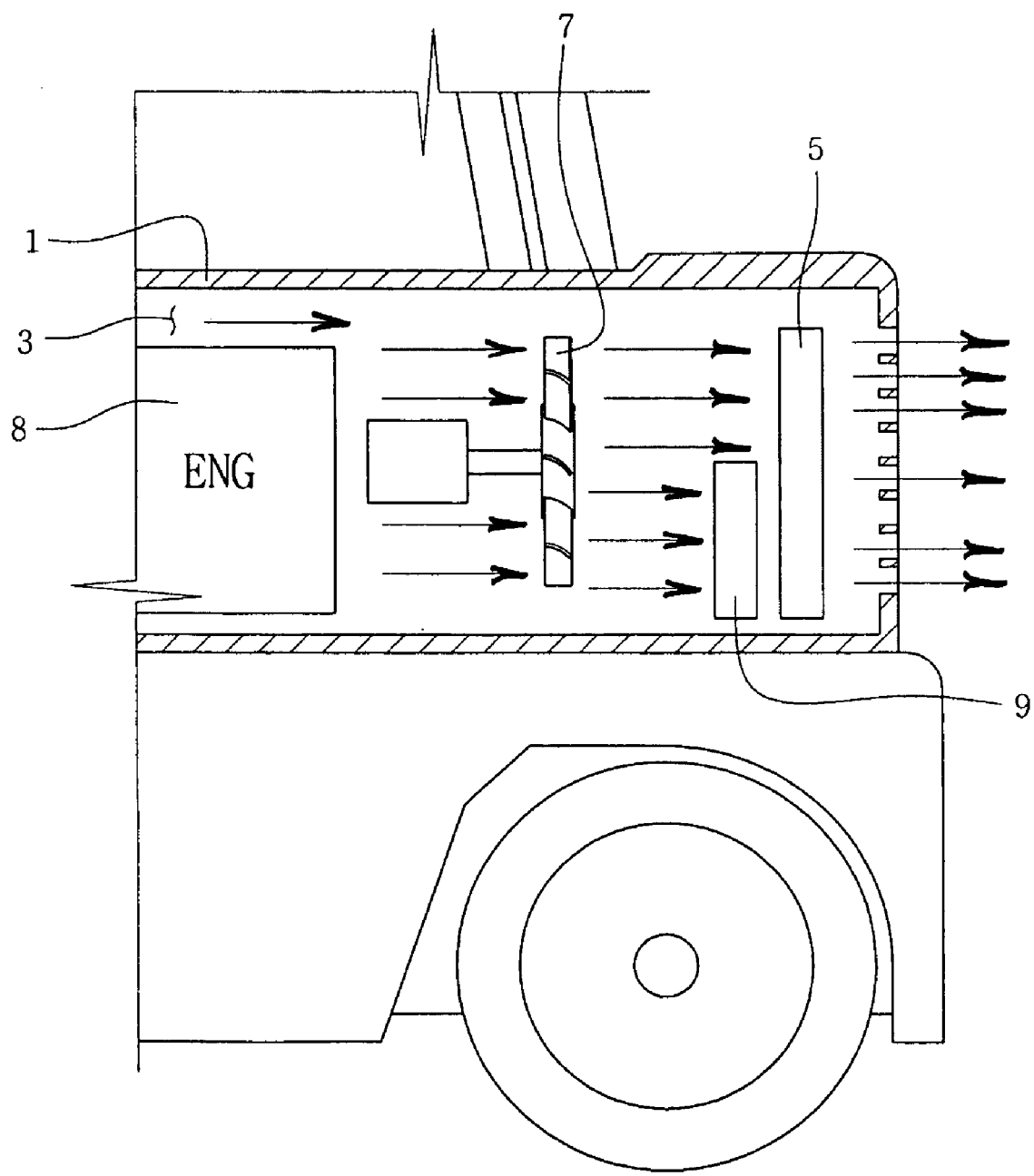
FIG. 1 is a perspective view showing a common use pedal device for automotive vehicles in accordance with the present invention.
Figure 2:
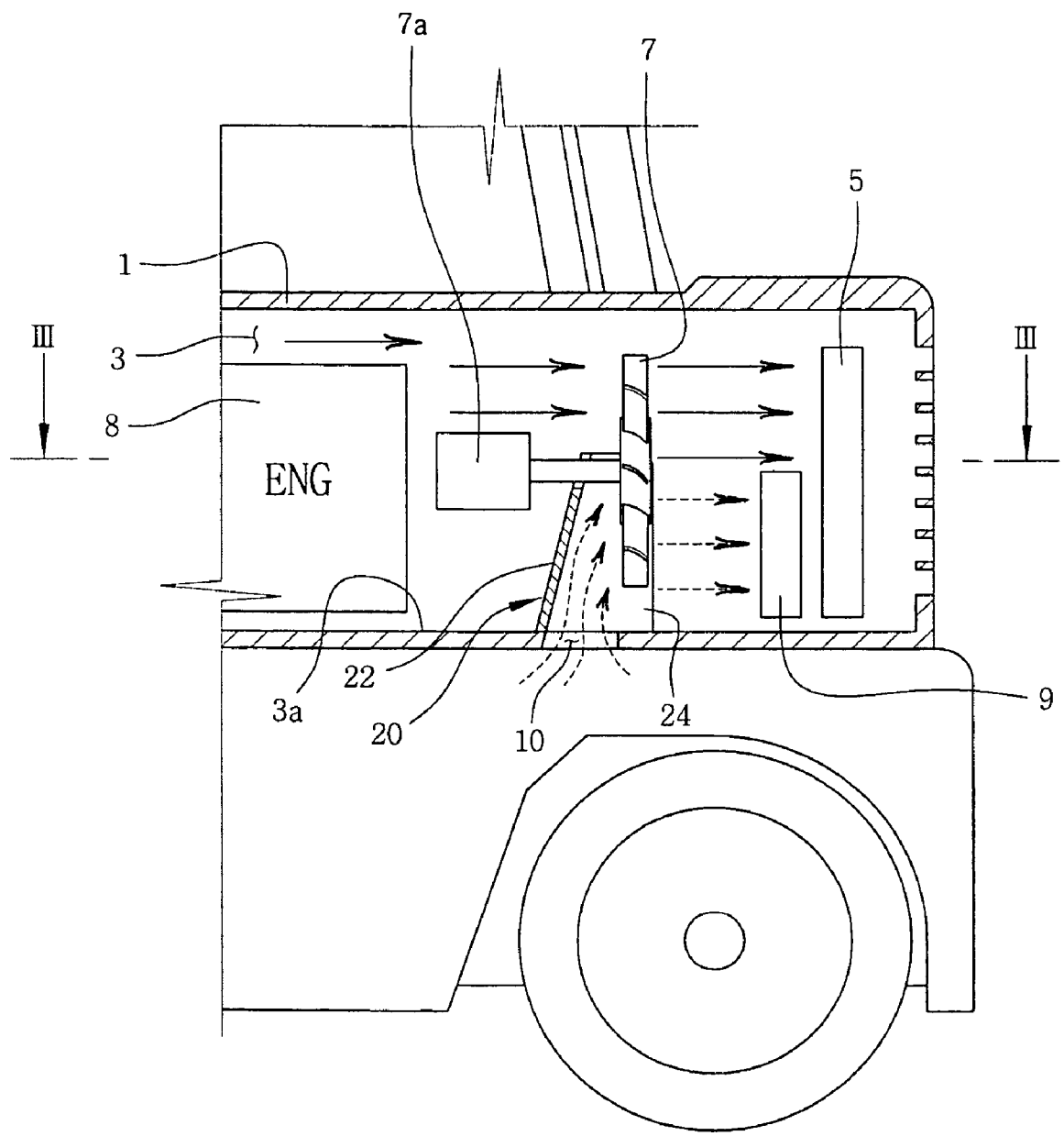
FIG. 2 is a right side elevational view of the common use pedal device of the present invention shown in FIG. 1.

Referring now to the drawings wherein the showings are for purposes of illustrating a preferred embodiment of the invention only and not for purposes of limiting the same, FIGS. 1–8 show the present invention.

Referring first to FIGS. 1 through 5, the common use pedal device of the present invention includes a base plate 10 fixedly secured to a floor 1 of a driver's compartment of automotive vehicles. The base plate 10 is provided with a generally rectangular planar part 12 and an extension part 14 protruding downwards from the periphery of the planar part 12. The planar part 12 is secured to the floor 1 of the driver's compartment by means of a fastener means, e.g., screws, and the extension part 14 is protruded to below the floor 1 of the driver's compartment through a maintenance opening (3).

Figure 4:
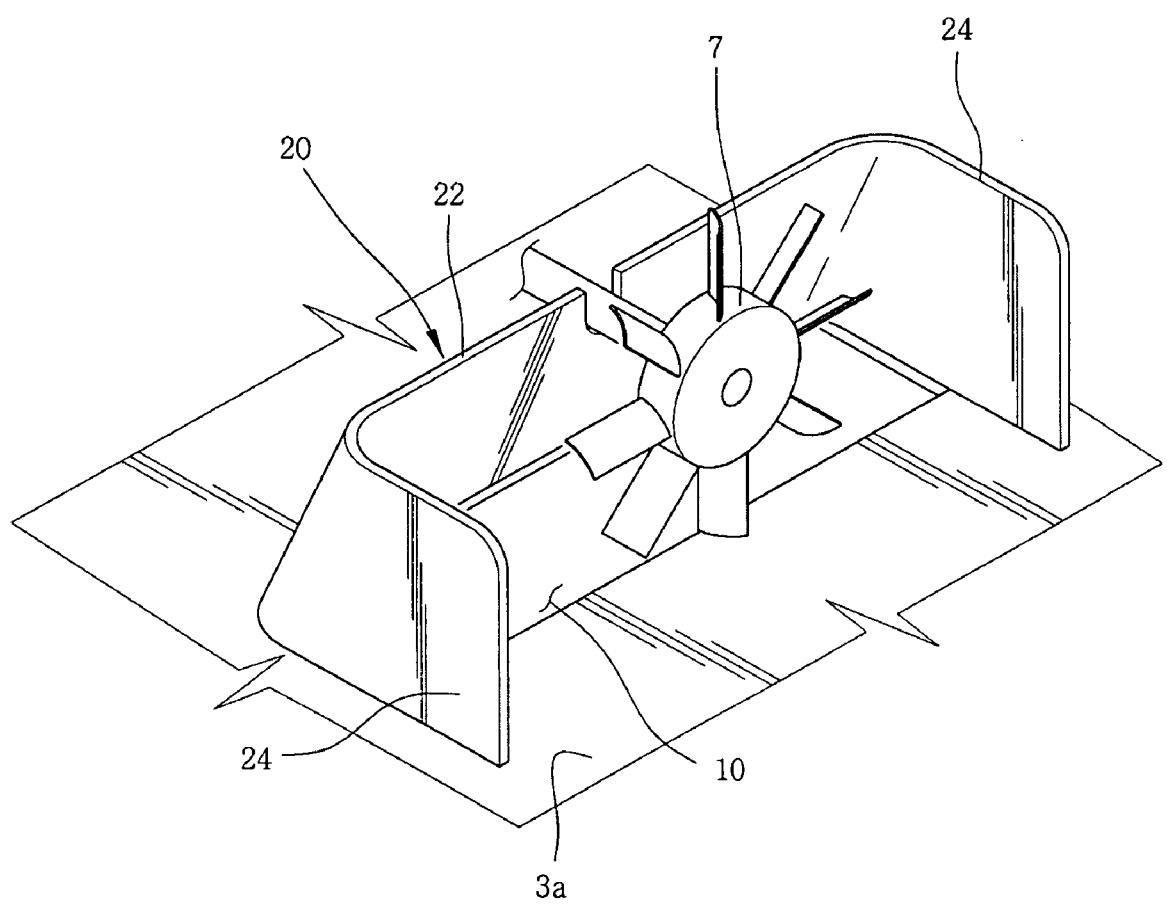
FIG. 4 is a partially cut-away right side elevational view of the common use pedal device of the present invention shown in FIG. 1.

As best shown in FIG. 4, a rotating member 20 is rotatably mounted beneath the planar part 12 of the base plate 10. The rotating member 20 is composed of a hub 22 rotatable about a center shaft 20a, a pulling arm 24 and a depression arm 26 extending radially outwardly from the hub 22 with a predetermined angular spacing left therebetween.

The hub 22 of the rotating member 20 is normally biased toward its rest position by virtue of a return spring 22a and can be caused to rotate away from the rest position when an external force is exerted against the resilient force of the return spring 22a. The pulling arm 24 has a plurality of cable catch holes 24a for holding the terminal end of a manual operating cable (C) which is operatively connected to, for example, a throttle valve (not shown) of a vehicle engine. The pulling arm 24 can be rotated together with the hub 22 in a counterclockwise direction in FIG. 4 to pull the cable (C).

The cable catch holes 24a are formed in multiple numbers (three in the illustrated embodiment) along the length of the pulling arm 24 and disposed at different radial positions from an axis of the rotating member 20 to have different radii of rotation. The pulling amount of the cable (C) varies depending on by which catch holes 24a the cable (C) is held. This means that the pulling amount of the cable (C) can be adjusted by selection of the catch holes 24a that hold the cable (C).

The catch holes 24a are arranged along an inclined line so that they can have different horizontal distances (L1, L2 and L3) from the terminal end of the cable (C). The catch holes 24a having such different horizontal distances (L1, L2 and L3) help to accommodate themselves to different kinds of manual operating cables whose end positions may well vary with the kinds of automotive vehicles.

The depression arm 26 is so sized and arranged that it can be depressed and rotated together with the hub 22 by a pedal 40 set forth later. Rotation of the hub 22 causes the pulling arm 24 to swing counterclockwise, thus pulling the cable (C) to the right when viewed in FIG. 4. The depression arm 26 carries, at its distal end, a roller 26a that makes a rolling contact with the pedal 40 with a reduced frictional force.

Figure 3:
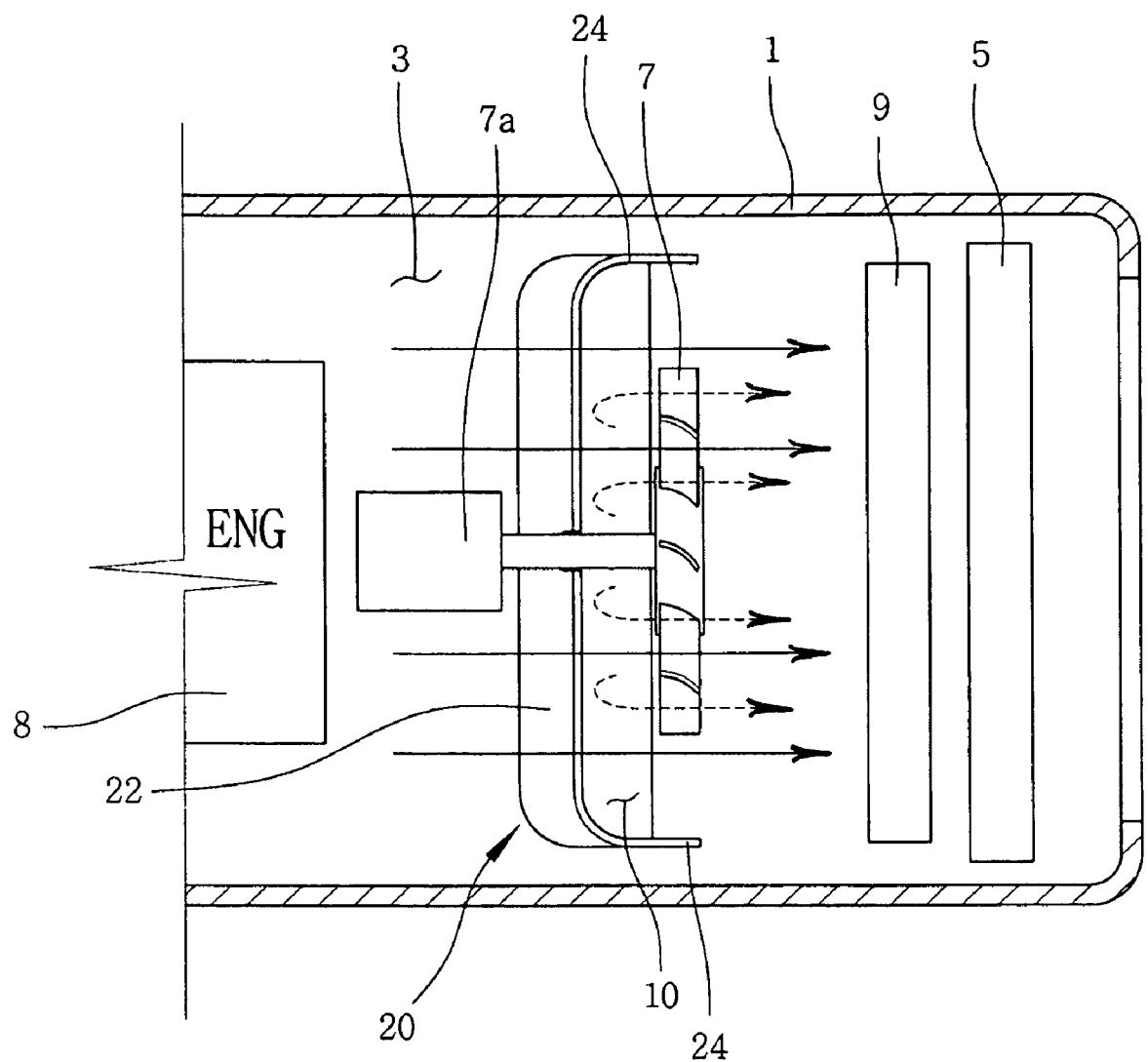
FIG. 3 is a left side elevational view of the common use pedal device of the present invention shown in FIG. 1.
Figure 5:
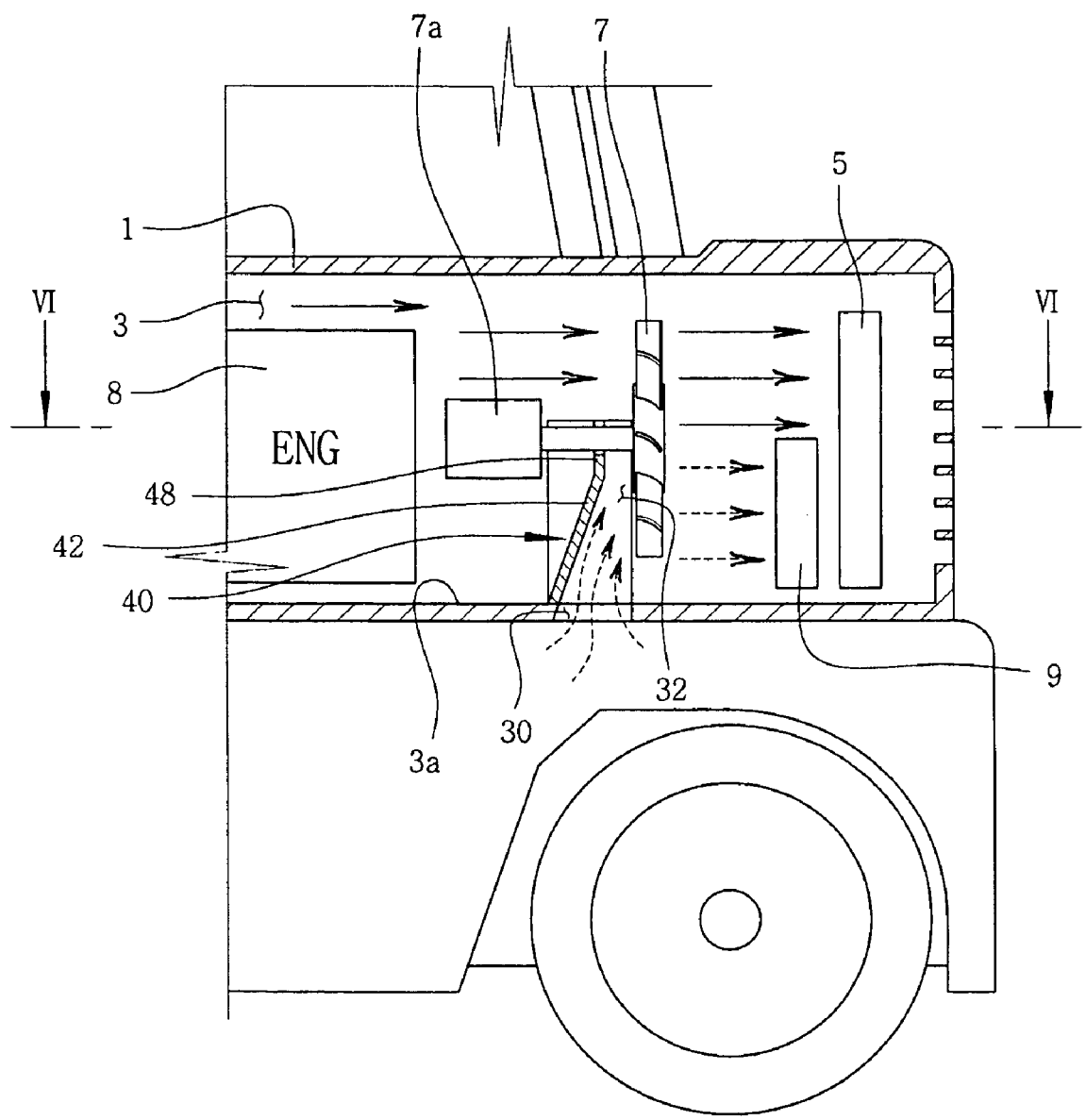
FIG. 5 is a rear view of the common use pedal device of the present invention shown in FIG. 1.

Turning to FIGS. 3 and 5, it can be seen that a rotation detecting sensor 30 for detecting the degree of rotation of the rotating member 20 is attached on one side of the base plate 10.

The rotation detecting sensor 30, which comprises a Hall sensor or a potentiometer for example, is adapted to detect the degree of rotation of the rotating member 20 and notify an electronic control unit (ECU) 25 of the degree of rotation thus detected. The electronic control unit 25 controls, in a well-known manner, an engine or other operating parts of automotive vehicles in response to the signals supplied from the rotation detecting sensor 30.

It is desirable that the rotation detecting sensor 30 be disposed in a coaxial relationship with the rotating member 20 to detect the degree of rotation of the center shaft 20a about which the rotating member 20 is caused to rotate. In view of the fact that the rotating member 20 is rotatable with the same degree of rotation as the pedal 40, it may be possible to detect the degree of pivotal movement of the pedal 40 instead of the degree of rotation of the rotating member 20, in which case the rotation detecting sensor 30 will have to be placed in a position suitable for detection of the movement of the pedal 40.

Referring back to FIGS. 1 through 5, the pedal device of the present invention includes the pedal 40 pivotably mounted on the base plate 40. The pedal 40 is rotatable about a pivot pin 40a and, as best shown in FIG. 4, is resiliently biased upwards by a return spring 40b wound around the pivot pin 40a. This assures that the pedal 40 is returned back to a rest position whenever a driver removes his or her foot from the pedal 40.

A push rod 42 extends downwardly from the underneath surface of the pedal 40 through a through-hole 12a of the planar part 12 of the base plate 10 and makes contact with the roller 26a of the depression arm 26. As the pedal 40 is pressed down by the driver, the push rod 42 moves downwards together with the pedal 40 and depresses the roller 26a of the depression arm 26, thereby causing the rotating member 20 to rotate counterclockwise when viewed in FIG. 4.

As can be seen in FIGS. 4 through 7, the pedal device of the present invention further includes a stroke adjustor means for adjusting the stroke of the pedal 40. The stroke adjustor means is provided with a height-adjustable stopper arrangement 50 lying on the underside of the pedal 40. The stopper arrangement 50 consists of a fixed stopper 52 fixedly secured to the underneath surface of the pedal 40 and a movable stopper 54 displaceable with respect to the fixed stopper 52.

Figure 6:
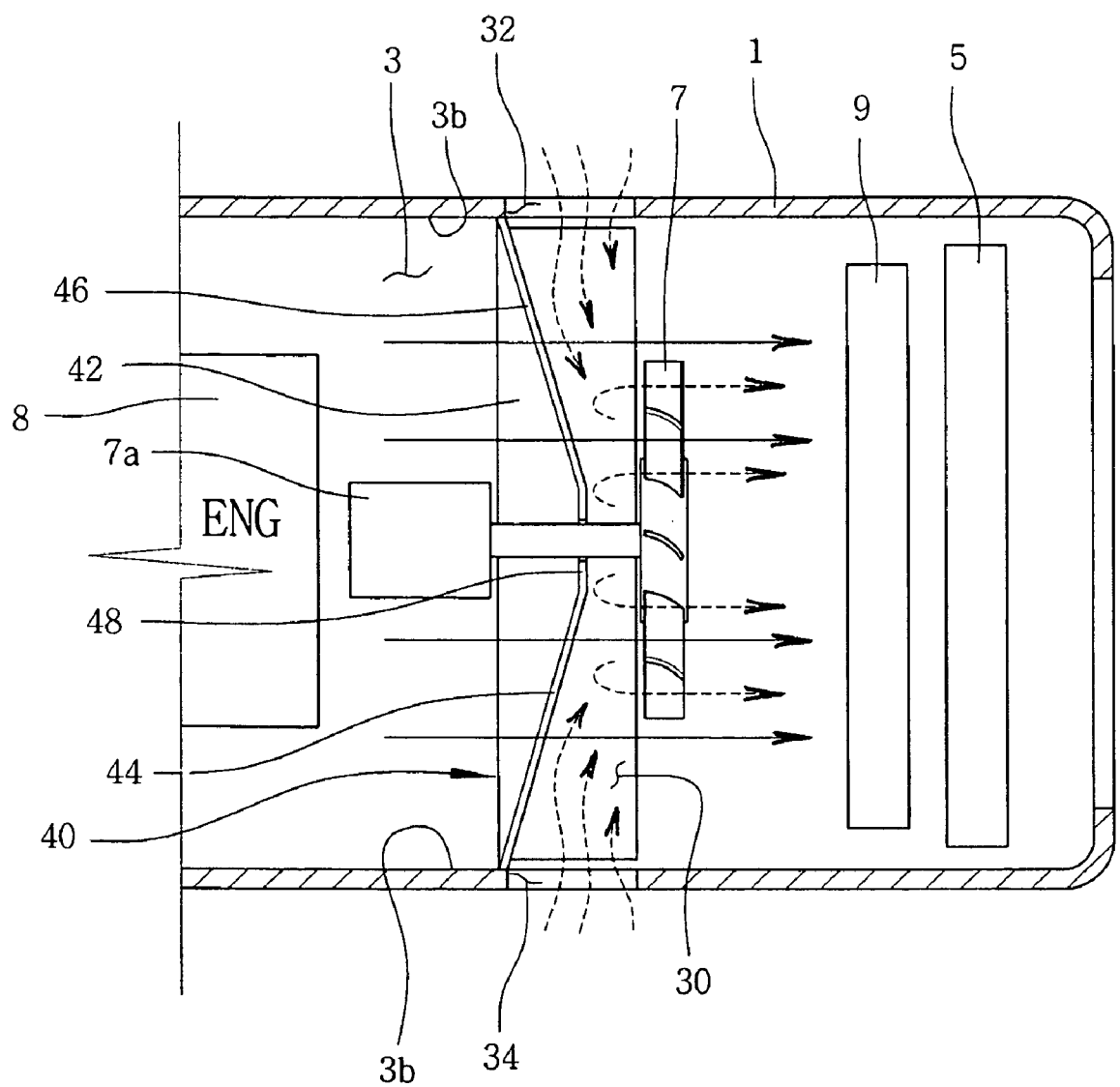
FIG. 6 is an exploded perspective view showing a stopper arrangement employed in the common use pedal device of the present invention.
Figure 7:
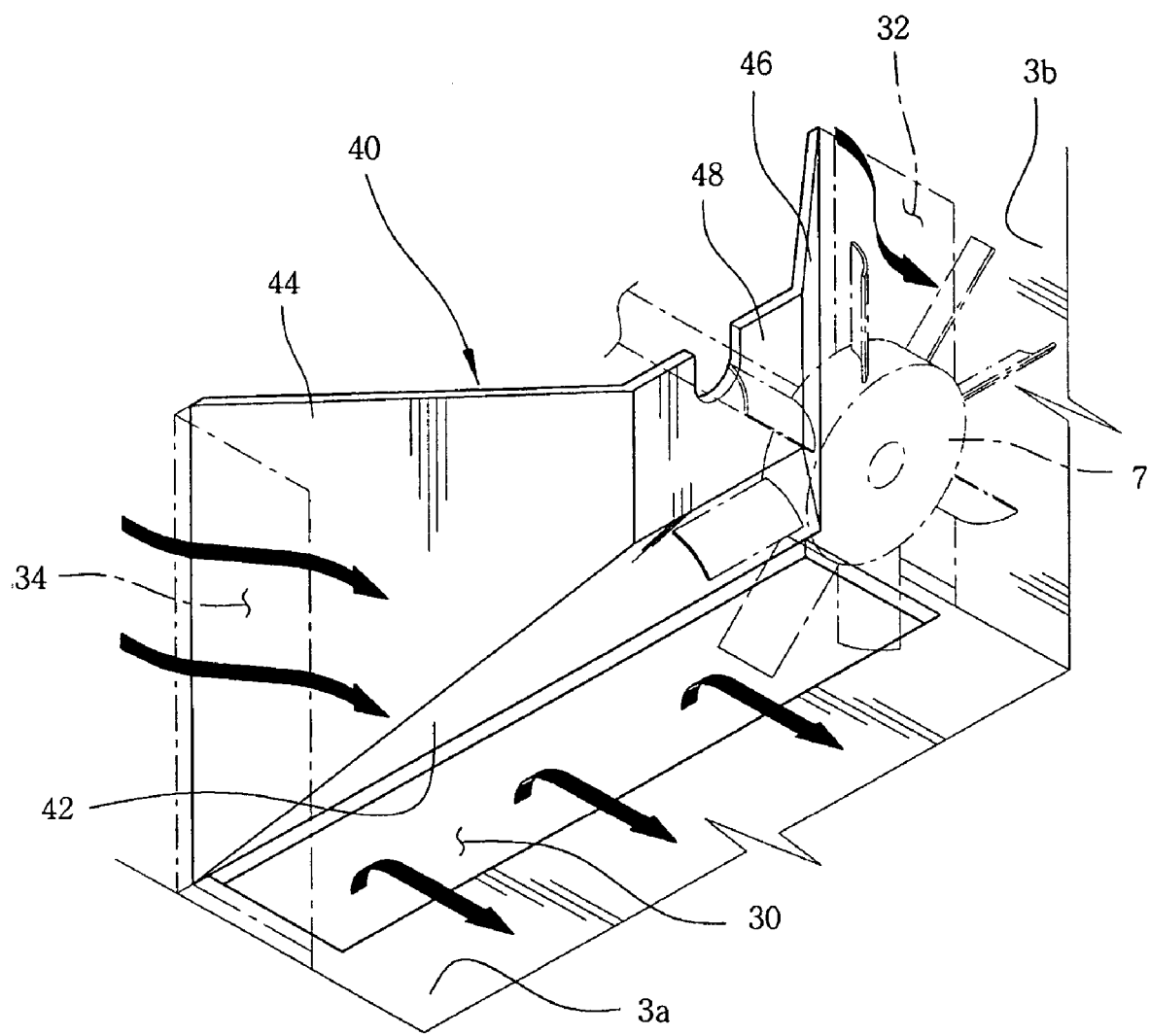
FIG. 7 is a side elevational section view showing a stopper arrangement employed in the common use pedal device of the present invention.

As clearly shown in FIGS. 4, 6 and 7, the fixed stopper 52 has a slant bottom surface 52a inclined at a predetermined angle with respect to the top surface of the base plate 10. The movable stopper 54 is displaceable upwardly or downwardly along the slant bottom surface 52a for changing the spacing between the top surface of the base plate 10 and the movable stopper 54 to thereby adjust the rotational stroke of the pedal 40.

The stroke adjustor means is further provided with a fastener means for releasably affixing the movable stopper 54 to the slant bottom surface 52a of the fixed stopper 52. As shown in FIG. 7, the fastener means includes a slot 60 formed along the slant bottom surface 52a of the fixed stopper 52, a fixing bolt 62 inserted through the slot 60 for holding the movable stopper 54 in a rotatable and axially movable manner, and a nut 64 threadedly engaged with the end of the fixing bolt 62 for affixing the movable stopper 54 against the fixed stopper 52.

The stroke adjustor means is still further provided with a slip-proof means for preventing the movable stopper 54 from slipping with respect to the slant bottom surface 52a of the fixed stopper 52. The slip-proof means includes a plurality of V-shaped grooves 70 formed contiguously on the slant bottom surface 52a of the fixed stopper 52 and a plurality of triangular protrusions 72 engaged with the V-shaped grooves 70.

According to the stroke adjustor means as noted above, the rotational stroke of the pedal 40 and hence the degree of rotation of the rotating member 20 can be adjusted with ease, thus making it possible to adjust the pulling amount of the cable (C) or the electric signal generation range of the rotation detecting sensor 30 which varies with the degree of rotation of the rotating member 20.

The stroke adjustor means, which is adapted to adjust the pedal stroke simply by selecting the position of the movable stopper 54, can be conveniently used in case that a need exists to change the pulling amount of the cable (C) or the electric signal generation range in conformity with the structure of a particular automotive vehicle incorporating the pedal device of the present invention.

As is apparent in FIG. 6, a couple of spaced-apart support plates 56 extend downwards from opposite flank sides of the fixed stopper 52 to sandwichedly accommodate the movable stopper 54 therebetween. The fixed stopper 52 may be integrally formed with the push rod 42 in an effort to improve the manufacturability of the pedal device.

Figure 8:
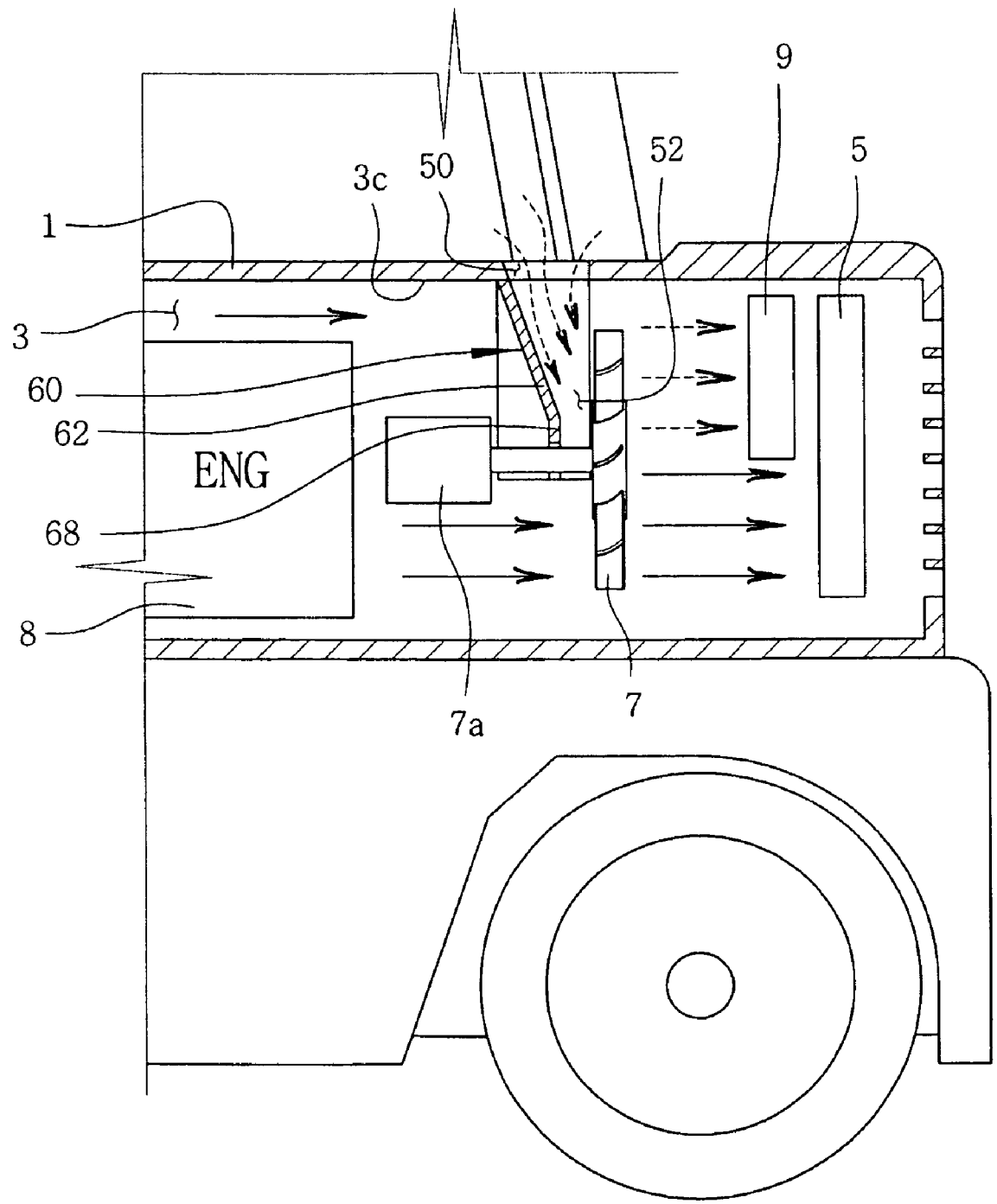
FIG. 8 is a partially cut-away side elevational view illustrating operative conditions of the common use pedal device of the present invention.
Figure 9:
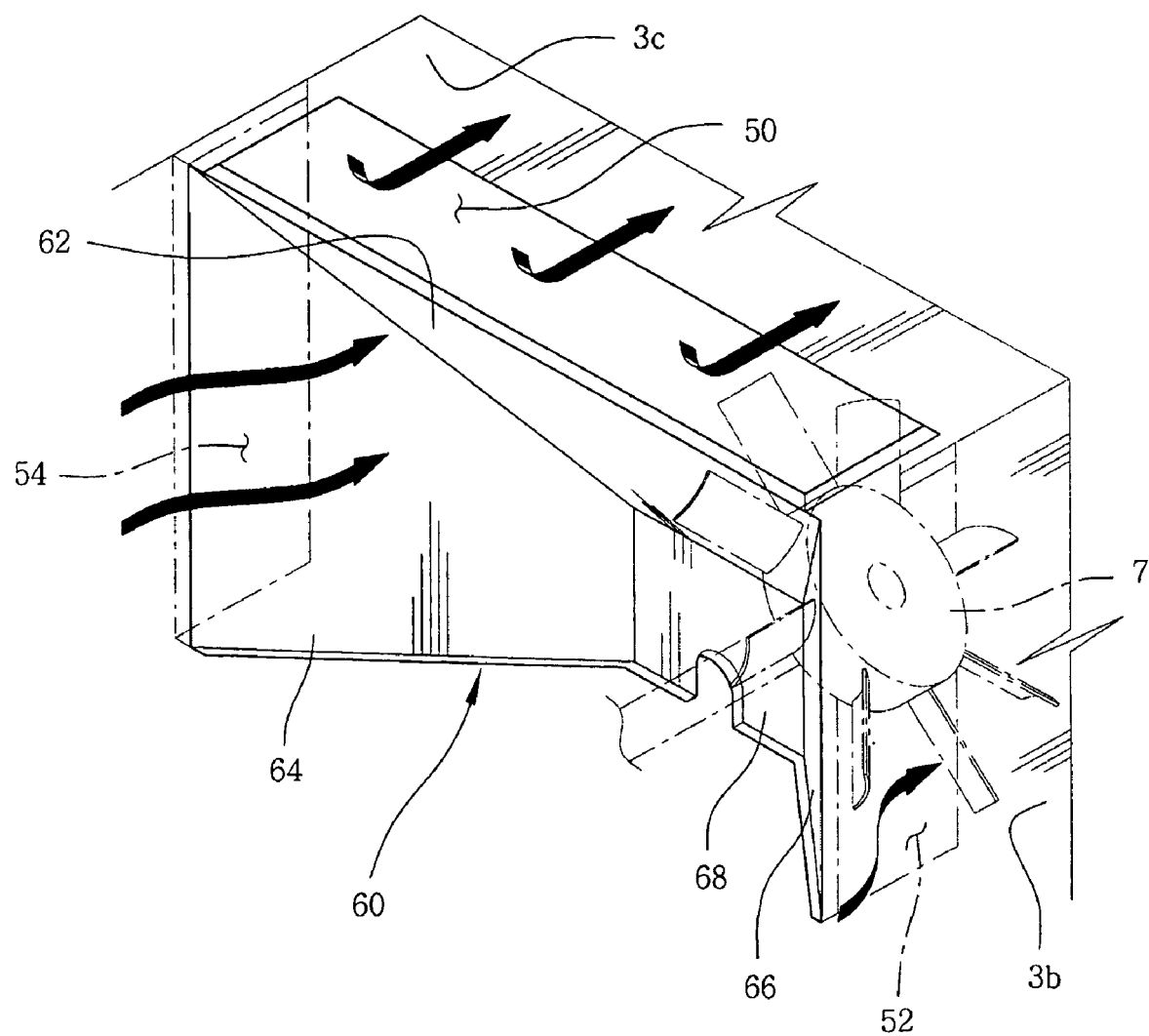
FIG. 9 is a bottom perspective view illustrating an external air introduction means and a shroud employed an engine-driven vehicle cooling device according to the third embodiment of the present invention shown in FIG. 8.

Referring to FIGS. 4 and 8, the pedal device of the present invention includes a cable support bracket 80 for slidably supporting the cable (C). The cable support bracket 80 holds a cable sheath (C1) and detachably attached to the extension part 14 of the base plate 10. The cable support bracket 80 is removably locked up to the extension part 14 by means of a latch means.

The latch means includes a latch hook 82 with a lever part 88 rotatably secured to the cable support bracket 80, a latch hole 84 formed through the extension part 14 of the base plate 10 for receiving the latch hook 82 and a torsion spring 86 for resiliently urging the latch hook 82 into engagement with the latch hole 84. By manually pressing the lever part 88, the latch hook 82 is disengaged from the latch hole 84.

As noted above, the cable support bracket 80 is releasably attached to the base plate 10 while holding the cable (C) and, if desired, may be separated from the base plate 10. This assures easier replacement of the cable (C) when damaged or broken.

Now, operation and beneficial effects of the common use pedal device according to the present invention will be described with reference to FIGS. 3, 4 and 8.

In case of applying the pedal device of the present invention to a manually controlled automotive vehicle, the base plate 10 is first attached to the floor 1 of the driver's compartment and the cable sheath (C1) covering the cable (C) is affixed to the cable support bracket 80, at which time the cable support bracket 80 remains mounted to the base plate 10.

Subsequently, the terminal end of the cable (C) is fastened to the pulling arm 24 of the rotating member 20 in alignment with one of the cable catch holes 24a of the pulling arm 24.

If the driver presses down the pedal 40 under this state, the pedal is swung downwards to depress the depression arm 26 of the rotating member 20, in response to which the rotating arm 20 is caused to rotate together with the pulling arm 24. Rotation of the pulling arm 24 pulls the cable (C), thus actuating various parts of the automotive vehicle, such as a throttle valve, a brake and a clutch operatively associated with the cable (C).

Meanwhile, in case of applying the pedal device of the present invention to an electronically controlled automotive vehicle, the base plate 10 is attached to the floor 1 of the driver's compartment and the rotation detecting sensor 30 is brought into connection with the electronic control unit 25. There is no need to fasten the terminal end of the cable (C) to the pulling arm 24 of the rotating member 20.

If the driver presses down the pedal 40 under this state, the pedal is swung downwards to depress the depression arm 26 of the rotating member 20, in response to which the rotating arm 20 is caused to rotate. The degree of rotation of the rotating member 20 is detected and notified to the electronic control unit 25. This enables the electronic control unit 25 to control a vehicle engine in response to the detection signals inputted from the rotation detecting sensor 30.

As described in the foregoing, the common use pedal device for automotive vehicles in accordance with the present invention can be applied, with no limitation, to both a manually controlled automotive vehicle and an electronically controlled automotive vehicle, owing to the provision of a mechanical pulling device and an electric detection means.

Furthermore, by making the rotation stroke of a pedal adjustable, it becomes possible to readily adjust the pulling amount of a cable or the electric signal generation range which varies with the rotation angle of a pedal.

In addition, the pedal device of the present invention allows a manual operating cable to be replaced and repaired with increased convenience.

Although one preferred embodiment of the present invention has been described in detail hereinabove, it will be apparent to those skilled in the art that various changes or modifications may be made thereto within the scope of the invention defined by the appended claims.

I claim:

1. An engine-driven vehicle cooling device, comprising:
   an engine room for reception of an engine;
   a radiator provided within the engine room for cooling down a cooling water circulating through the engine;
   a cooling fan positioned between the engine and the radiator for blowing an internal air present in the engine room toward the radiator;

a charged air cooler smaller in size than the radiator and disposed between the radiator and the cooling fan in a parallel relationship with the radiator;

a shroud provided at an intake side of the cooling fan in the engine room for obstructing a stream of the internal air heading for the charged air cooler; and an external air introduction means provided between the shroud and the cooling fan for allowing an external air present outside the engine room to be supplied to the charged air cooler as the cooling fan is caused to rotate.

2. The engine-driven vehicle cooling device as recited in claim 1, wherein the external air introduction means comprises an inlet opening formed through a wall of the engine room in between the cooling fan and the shroud for bringing the engine room in communication with the outside.

3. The engine-driven vehicle cooling device as recited in claim 2, wherein the shroud extends from an engine-side edge of the inlet opening into the engine room to shade a part of the cooling fan from the stream of the internal air.

4. The engine-driven vehicle cooling device as recited in claim 3, wherein the shroud is slanted at a predetermined angle with respect to the cooling fan so as to direct a stream of the external air to the cooling fan.

5. The engine-driven vehicle cooling device as recited in claim 3, wherein the shroud is provided with opposite side plate parts so curved as to at least partially enclose flank ends of the cooling fan.

6. The engine-driven vehicle cooling device as recited in claim 2, wherein the inlet opening comprises a bottom opening formed through a bottom wall of the engine room and side openings formed through side walls of the engine room between the cooling fan and the shroud.

7. The engine-driven vehicle cooling device as recited in claim 6, wherein the shroud comprises peripheral plate parts respectively extending from engine-side edges of the bottom opening and the side openings toward the center of the engine room and a central plate part disposed at the center of the engine room to join with the peripheral plate parts.

8. The engine-driven vehicle cooling device as recited in claim 7, wherein each of the peripheral plate parts is slanted at a predetermined angle toward the cooling fan so as to direct a stream of the external air to the cooling fan.

* * * * *